United States Patent
Moake

(10) Patent No.: US 9,354,050 B2
(45) Date of Patent: May 31, 2016

(54) BOREHOLE CHARACTERIZATION

(75) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1081 days.

(21) Appl. No.: 12/523,149

(22) PCT Filed: Apr. 12, 2007

(86) PCT No.: PCT/US2007/009136
§ 371 (c)(1),
(2), (4) Date: Dec. 1, 2009

(87) PCT Pub. No.: WO2008/127237
PCT Pub. Date: Oct. 23, 2008

(65) Prior Publication Data
US 2010/0076688 A1    Mar. 25, 2010

(51) Int. Cl.
*G01V 3/18* (2006.01)
*G01V 3/02* (2006.01)
*G01V 3/08* (2006.01)
*G01V 3/34* (2006.01)
*G01B 21/20* (2006.01)
*E21B 47/08* (2012.01)
*G01V 5/12* (2006.01)

(52) U.S. Cl.
CPC ............... *G01B 21/20* (2013.01); *E21B 47/08* (2013.01); *G01V 5/125* (2013.01)

(58) Field of Classification Search
CPC ....................................................... E21B 10/00
USPC ........ 702/6–9, 11, 14, 179, 182, 183; 33/304; 73/152.02; 250/266
See application file for complete search history.

(56) References Cited

U.S. PATENT DOCUMENTS

| | | | |
|---|---|---|---|
| 5,017,778 A * | 5/1991 | Wraight | 250/254 |
| 5,130,950 A | 7/1992 | Orban et al. | |
| 5,451,779 A * | 9/1995 | Spross et al. | 250/266 |
| 5,469,736 A | 11/1995 | Moake | |
| 5,513,528 A * | 5/1996 | Holenka et al. | 73/152.03 |
| 5,638,337 A | 6/1997 | Priest | |
| 6,038,513 A * | 3/2000 | Varsamis et al. | 702/6 |
| 6,065,219 A | 5/2000 | Murphey et al. | |

(Continued)

FOREIGN PATENT DOCUMENTS

WO    WO-2008/127237    10/2008

OTHER PUBLICATIONS

"International Application Serial No. PCT/US2007/009136, Search Report mailed Jul. 28, 2008", p. 220.

(Continued)

*Primary Examiner* — Gregory J Toatley
*Assistant Examiner* — Felix Suarez
(74) *Attorney, Agent, or Firm* — Schwegman, Lundberg & Woessner, P.A.; Alan Bryson

(57) ABSTRACT

In some embodiments, apparatus and systems, as well as methods, may operate to acquire borehole standoff data (321), segregate the standoff data into a plurality of azimuthal bins (363), derive a plurality of diameters from the standoff data in the bins, determine an average borehole diameter from the plurality of diameters (367), calculate a standard deviation from the average borehole diameter (375), and compute a caliper measurement (383), a major elliptical axis length, and a minor elliptical axis length based on the average borehole diameter and the standard deviation (387).

42 Claims, 7 Drawing Sheets

(56) References Cited

U.S. PATENT DOCUMENTS

| | | | | |
|---|---|---|---|---|
| 6,285,026 | B1* | 9/2001 | Evans et al. | 250/269.4 |
| 6,584,837 | B2* | 7/2003 | Kurkoski | 73/152.02 |
| 7,129,477 | B2* | 10/2006 | Schneider et al. | 250/266 |
| 7,143,521 | B2* | 12/2006 | Haugland | 33/304 |
| 7,260,477 | B2* | 8/2007 | Haugland | 702/6 |
| 7,279,677 | B2* | 10/2007 | Ellis et al. | 250/266 |
| 2006/0271299 | A1 | 11/2006 | Ward et al. | |
| 2007/0040110 | A1 | 2/2007 | Ellis et al. | |
| 2007/0144789 | A1* | 6/2007 | Johnson et al. | 175/431 |

OTHER PUBLICATIONS

"International Application Serial No. PCT/US2008/009136, Written Opinion mailed Jul. 28, 2008", p. 237.

Frisch, Gary J, et al., "Advanced Ultrasonic scanning tool and evaluation methods improve and standardize casing inspection", *SPWLA 42nd Annual Logging Symposium*, (Jun. 2001), 1-14.

"International Application Serial No. PCT/US2007/009136, International Preliminary Report on Patentability mailed May 16, 2012", 10 pgs.

\* cited by examiner

BOREHOLE CHARACTERIZATION

RELATED APPLICATION

This application is a nationalization under 35 U.S.C. 371 of PCT/US2007/009136, filed Apr. 12, 2007 and published as WO 2008/127237 A1, on Oct. 23, 2008; which application and publication are incorporated herein by reference in their entirety and made a part hereof.

TECHNICAL FIELD

Various embodiments described herein relate to determining borehole characteristics in geological formations, including borehole geometry, and formation density and porosity.

BACKGROUND INFORMATION

Fluids (e.g., oil, water, gas) may exist in a variety of materials, including geologic formations. These fluids are often recovered via a well, or borehole cut into the formation. During exploration and recovery operations, it is useful to determine the caliper and ellipticity of the borehole as an indication of formation stress, compaction, and other mechanisms that operate to deform the borehole. However, rapidly and accurately assessing the caliper and ellipticity of the borehole, especially when the downhole tool acquiring the associated data moves off-center, can be difficult. Thus, improved apparatus, systems, and methods are needed to quickly and reliably determine the caliper and ellipticity of boreholes in geologic formations, under a variety of measurement conditions.

DETAILED DESCRIPTION

In some embodiments of the invention, the challenges described above may be addressed by determining values representing the borehole caliper, as well as the length of the major and minor axes of an ellipse approximating the contour of the borehole wall, from borehole standoff measurements. Ellipticity may be computed from a ratio of the lengths of the major and minor axes.

Borehole standoff measurements can be made in many ways. Common methods include mechanical devices that follow the contour of the borehole and acoustic/ultrasonic devices that measure the time it takes pressure waves to travel from the tool to the formation wall and back. A less common method is to use a gamma-gamma density tool. These tools contain a source of gamma rays and detectors that sense gamma rays that scatter into the formation and then back into the tool. Besides measuring the formation density, these tools commonly determine a quantity known as the density correction, which is strongly dependent on standoff, mud weight, and formation density. By measuring the formation density, which is the primary function of the tool, and measuring the mud weight or providing it as an external parameter, standoff can be computed.

Figure 1A:
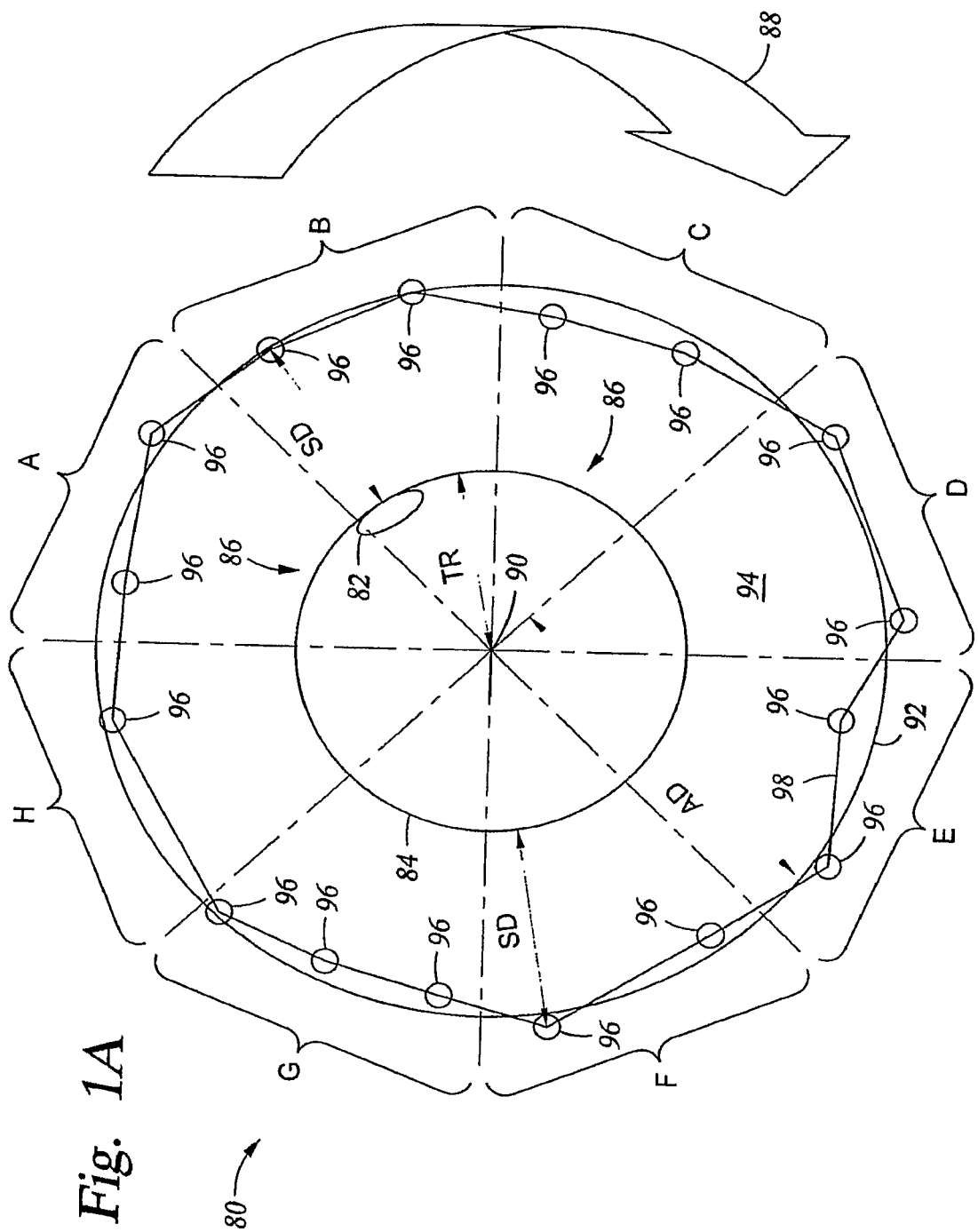
FIGS. 1A-1B illustrate acquisition and measurement apparatus according to various embodiments of the invention.
Figure 1B:
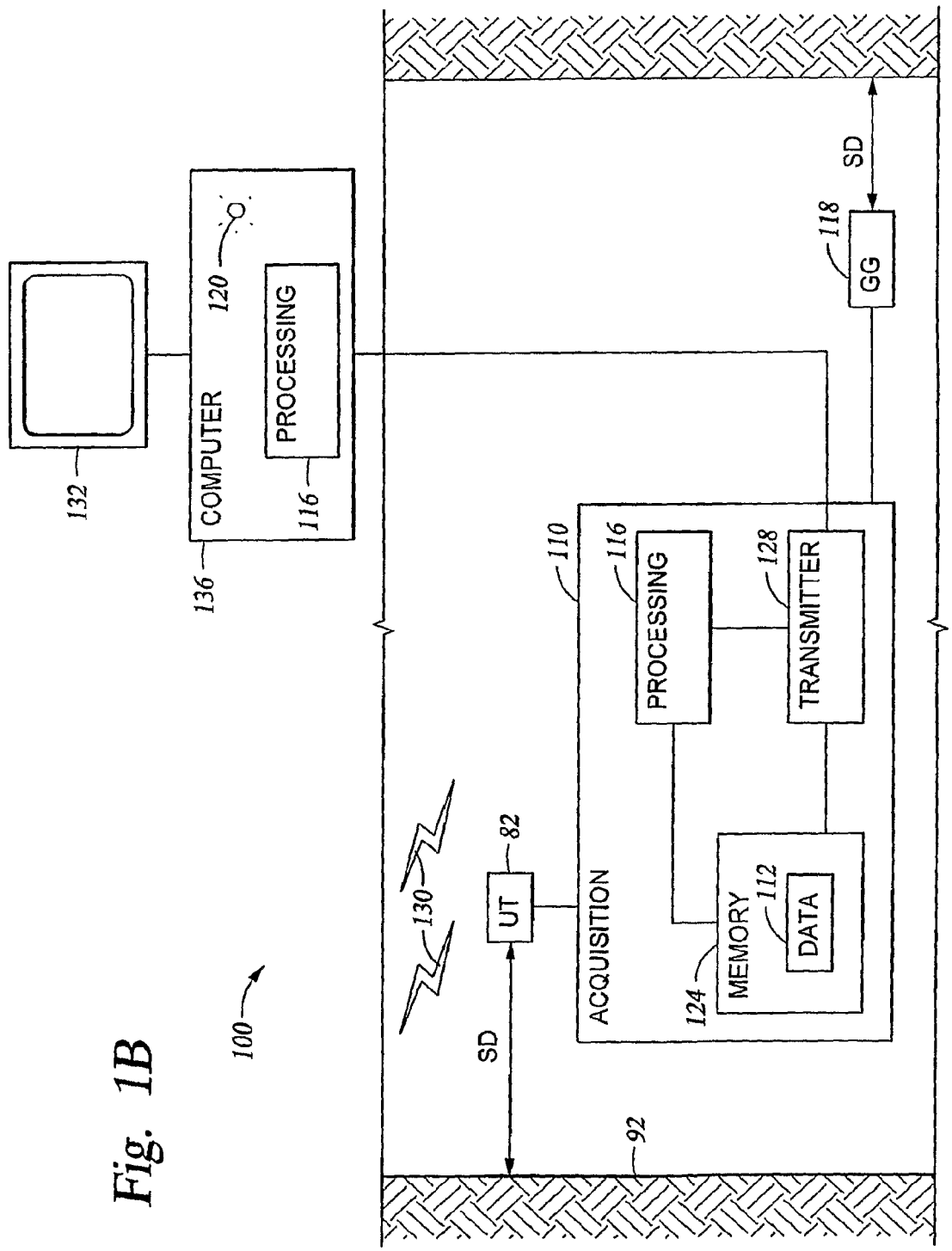

FIGS. 1A-1B illustrate acquisition apparatus 80 and measurement apparatus 100 according to various embodiments of the invention. Throughout the following discussion, it is assumed that borehole standoff measurement data is acquired using a single rotating transducer 82 (e.g., a pulse-echo ultrasound transducer), well known to those of ordinary skill in the art. That is, while the transducer 82, mounted proximate to the face 84 of a downhole tool 86, is rotated in an azimuthal direction 88 about the centerline 90 of the borehole 92, ultrasonic energy is transmitted and received by the transducer 82. The time between launching the signal (e.g., the "IP" or initial pulse) and receiving its return, along with the speed of sound in the propagation medium 94, can be used to determine the standoff distance SD, as is well known to those of ordinary skill in the art. If the downhole tool 86 is perfectly centered on the centerline 90 of a perfectly cylindrical borehole 92 (as shown in FIG. 1A), the standoff distance SD plus the radius of the tool TR gives the radius of the borehole 92 at the point the measurement is taken. If standoff data 96 (e.g., comprising standoff distance SD measurements) is acquired throughout one complete revolution of the downhole tool 86, the actual contour 98 of the borehole wall (which is likely not perfectly cylindrical, as shown for the ideal borehole 92) at the transducer elevation may be obtained. It should be noted that, while pulse-echo transducers are described for simplicity herein, a pitch-catch transducer pair (e.g., comprising separate transmitting and receiving transducers) can also be used for the acquisition of standoff data 96.

To facilitate the measurement of small standoff distances, the transducer may be recessed below the surface of the tool, and is exposed directly to the borehole fluid. For the purposes of this document, the "standoff distance" SD is the distance from a point on the projected outer-diameter of the tool directly over the face of the measurement transducer 82 to the borehole wall (shown at each data point 96). The standoff distance SD, which likely varies as the tool 86 rotates in the azimuthal direction 88, may be calibrated as the distance from the downhole tool outer surface 84 to the wall, taking into account the distance the transducer 82 is recessed into the tool outer surface 84, electronic signals delays, etc.

If the borehole contour 98 is characterized as an ellipse, with a major axis length MA and a minor axis length MI, then the "caliper," which is defined herein to be the effective diameter of the borehole, can be determined as the average of the lengths of the major and minor elliptical axes $(MA+MI)/2$, or the square root of the product of the lengths of the major elliptical axis and the minor elliptical axis $\sqrt{MA*MI}$. Those of ordinary skill in the art may choose one equation over the other, depending on the expected characteristics of the borehole 92; in many instances, the resulting difference in the caliper obtained using one equation will vary by less than about 2% from the caliper obtained using the other.

Thus, in some embodiments, a method of determining the borehole caliper measurement may include acquiring standoff data 96. That is, as the transducer 82 rotates in the azimuthal direction, the data 96, representing the standoff distance SD for each data point, can be determined, as is well known to those of ordinary skill in the art.

The borehole standoff data 96 can then be segregated, or grouped into a plurality of azimuthal bins A-H. In this example, eight bins A-H are shown. However, any number of bins from four to any higher even number of bins (e.g., 6, 8, 10, 12, 14, 16, etc.) can be used. A plurality of diameters can then be derived from the borehole standoff data in opposing ones of the plurality of azimuthal bins.

For example, the data 96 in two opposing bins (e.g., A:E) can be averaged over each bin, and a simple sum of the two average standoff distances SD can be added to the diameter of the downhole tool, or two times the tool radius TR, to provide the borehole diameter. Any of the plurality of diameters obtained by manipulating the data 96 in this manner over each of the opposing bins A:E, B:F, C:G, and D:H can be selected as the caliper measurement. Some combination of the plurality of diameters (e.g., a simple average of the plurality of diameters, denoted by the average diameter AD) may also be selected as the caliper measurement.

In some embodiments, a method of determining the caliper measurement might include acquiring and segregating the borehole standoff data into a plurality of azimuthal bins, as described previously. After a plurality of diameters are derived from the acquired borehole standoff data (in opposing ones of the plurality of azimuthal bins), the average borehole diameter can be determined, such as by summing the diameters, and dividing by the number of diameters in the plurality. Finally, the caliper measurement can be computed, as described above.

The standard deviation ST from the average borehole diameter AD (with respect to the population comprising the plurality of diameters) can be calculated, so that the length of the major elliptical axis MA, and/or the length of the minor elliptical axis MI can be determined using the average borehole diameter AD and the standard deviation ST. This can be accomplished by using correction factors CF1, CF2, CF3, CF4, etc. to correct the average diameter and provide the major and minor axis lengths MA, MI based on the tool diameter and borehole size, as follows:

$$MA=AD+CF1*ST$$

$$MI=AD+CF2*ST+CF3*ST+CF4*ST$$

The correction factors CF1, CF2, CF3, CF4, etc. are determined by fitting theoretical data determined by the borehole size and downhole tool size while the tool is moved into several potential locations in the borehole, as will be shown by example below.

Data 96 may be acquired during many types of operations. For example, a nuclear logging system may take standoff measurements, without making any caliper measurements. Using the methods described above, the caliper can be determined indirectly, using the standoff measurement data 96. Caliper and ellipticity can be determined for a single revolution about the centerline 90 of the borehole 92, or some other number of revolutions, and then used to adjust neutron measurements and density signals, for example.

In the following paragraphs, the acquisition of standoff data and determination of borehole caliper is examined in further detail. Thus, during the acquisition of data 96 for a storage interval (e.g., at least one full rotation), or shortly afterward, the incoming stream of data 96 can be screened, perhaps by a secondary processor, such that anomalous values are corrected, nulled, or discarded before the data 96 is used in any calculations. The azimuthal location associated with each standoff data point 96 may be recorded along with the standoff distance SD, or the azimuthal location may be assumed (e.g., given the sequence number of the data point 96 within a series of such points during a single revolution of the transducer 82).

As noted above, the stream of data 96 can then be divided up into azimuthal bins. When more than one data point 96 is assigned to a bin (e.g., see bins A-G), the average of the assigned standoff data points within a single bin can be used. For example the standoff distance SD associated with two data points in bin A can be averaged to get the average standoff distance SD for bin A. Similarly, the standoff distance SD associated with three data points in bin G can be averaged to get the average standoff distance SD for bin G. The single data point 96 in bin H does not support averaging, and so its associated standoff distance SD can be used directly.

When at least one rotation of the transducer 82 has been completed, the bins A-H are analyzed, assuming the data 96 they contain represents an ellipse, and the lengths of the major and minor axes of the ellipse are computed. As part of the analysis, it is assumed that the tool 86 has not moved during the storage interval, so that standoff distances SD that are approximately 180 degrees apart (e.g., standoff distances SD associated with opposing bins, such as bins B:F) can be added to the tool diameter (e.g., twice the tool radius TR) to obtain the apparent borehole diameter along that direction.

A plurality of apparent diameters may thus be derived using borehole standoff data in opposing ones of the plurality of azimuthal bins in some cases (as described above), and in others, borehole standoff data in other bins may be used. For example, a diameter may be derived using the standoff data in a first bin A and the standoff data in another bin to one side or the other of the bin directly opposing bin A, such as either one of bins D or F.

In this manner, the number of apparent diameters that can be obtained equals approximately half the total number of azimuthal bins, since two bins are used to determine each diameter. Thus, if there are eight bins A-H as shown in FIG. 1A, then four apparent diameters can be obtained. The average and standard deviations of the plurality of diameter values thus obtained can be computed, from which the lengths of the major and minor axes are determined.

If multiple rotations of the tool 86 are accomplished during a storage interval, lengths of the major and minor axes can be determined for each rotation of the tool 86 during the interval. The values associated with the lengths of the major and minor axes MA, MI from each rotation may then be averaged to obtain the lengths of the two axes that are representative of the storage interval. Finally, the caliper may be taken as the average of the two axis lengths, and the ellipticity may be taken as the ratio of the major axis length to the minor axis length.

In another embodiment, standoff distance data in the azimuthal bins may be averaged over many rotations before the diameters, major and minor axis, or caliper are determined. This technique is appropriate when using a gamma-gamma density tool, which may acquire data over several rotations (which may equate to several seconds of operation) prior to computing a statistically meaningful result.

Refinements to account for downhole tool 86 motion will now be described. If the center of the tool 86 moves in the borehole 92 during a single rotation, the computed apparent diameters can be distorted. This effect can be reduced by taking data 96 over more than one rotation, such as from one-and-a-half rotations (e.g., 540 degrees). By averaging the standoff distance SD in the first 180 degrees of rotation with those from the last 180 degrees of the 540 degree rotational acquisition sequence, the resulting averaged standoff distance values often provide a more accurate end result, since there is a better measure of the data that can be used in conjunction with the standoff distance SD measured in the middle 180 degrees. This is because the average of two standoff measurements made 360 degrees apart when the tool is moving may provide a better estimate of what the tool would have read if it were at the same location at which the 180 degree standoff measurement was made than either of the un-averaged measurements. Averaging over several rotations may reduce tool movement-induced errors even further.

To implement the mechanisms described for determining a borehole caliper measurement, a variety of apparatus, systems, and methods may be used. For example, FIG. 1B illustrates a measurement apparatus 100 according to various embodiments of the invention. In some embodiments, the caliper measurement apparatus 100 may include one or more sensors 82 (e.g., ultrasound sensors) to receive signals 130.

The apparatus 100 may include acquisition logic 110 (e.g., acquisition logic circuitry) to acquire data 112, such as azimuthal location data, signals 130, and/or borehole standoff distance data 96 representing the standoff distance between a transducer 82 and a borehole 92. That is, the acquisition logic 110 may acquire the ultrasonic signals 130 directly as data 96, or digitize the signals 130 to provide digital data 96, to record information representing borehole standoff distance measurements. The sensor 82 may comprise a single rotating transducer to couple to the acquisition logic 110 to provide the borehole standoff data 96. In some embodiments, the apparatus 100 may comprise a gamma-gamma density tool 118 to couple to the acquisition logic 110 to provide the borehole standoff data.

The apparatus 100 may also include processing logic 116 to segregate the borehole standoff data into a plurality of azimuthal bins, derive a plurality of diameters from the borehole standoff data in the bins (including opposing ones of the bins), determine an average borehole diameter from the plurality of diameters, calculate a standard deviation from the plurality of diameters, and compute caliper measurements. The length of major elliptical axes MA and minor elliptical axes MI, based on the average borehole diameter AD and the standard deviation ST, may also be determined. In some embodiments, the apparatus 100 may include an ellipticity alarm 120 to indicate out-of-range ellipticity based on the determined major elliptical axis length and the minor elliptical axis length with respect to preselected thresholds for the borehole 92.

In some embodiments, the processing logic 116 may be used to segregate the borehole standoff data into a plurality of azimuthal bins as a function of any one of magnetic azimuth, true azimuth, and magnetic toolface. Those of ordinary skill in the art are aware that magnetic roll or magnetic toolface is defined as the angle of counterclockwise rotation about the X axis (looking in the positive X axis direction) required to zero the Y axis magnetometer output and position the Z axis magnetometer so that its output polarity is negative.

The apparatus 100 may also include a memory 124 to store the data 112. In some embodiments, the processing logic 116 may operate to compute adjustment values, and thereafter adjust various measurements, based on the caliper measurement values. These adjustments can be made to neutron measurements, natural gamma ray measurements, porosity measurements, and density measurements. The processing logic 116 may be included in a downhole tool, or above-ground (e.g., as part of an above-ground computer workstation, perhaps located in a logging facility), or both.

In some embodiments, the apparatus 100 may include one or more transmitters 128, such as telemetry transmitters, to transmit the data 112 to an above-ground computer 136. For example, one or more transmitters may be used to transmit one or more of a caliper measurement, the major elliptical axis length, or the minor elliptical axis length to the surface (e.g., above ground), where the above-ground computer 136 is located. The apparatus 100 may also include one or more displays 132 to display visual representations of caliper measurements, adjusted neutron measurements, adjusted natural gamma ray measurements, adjusted porosity measurements, and/or adjusted density measurements.

Figure 2A:
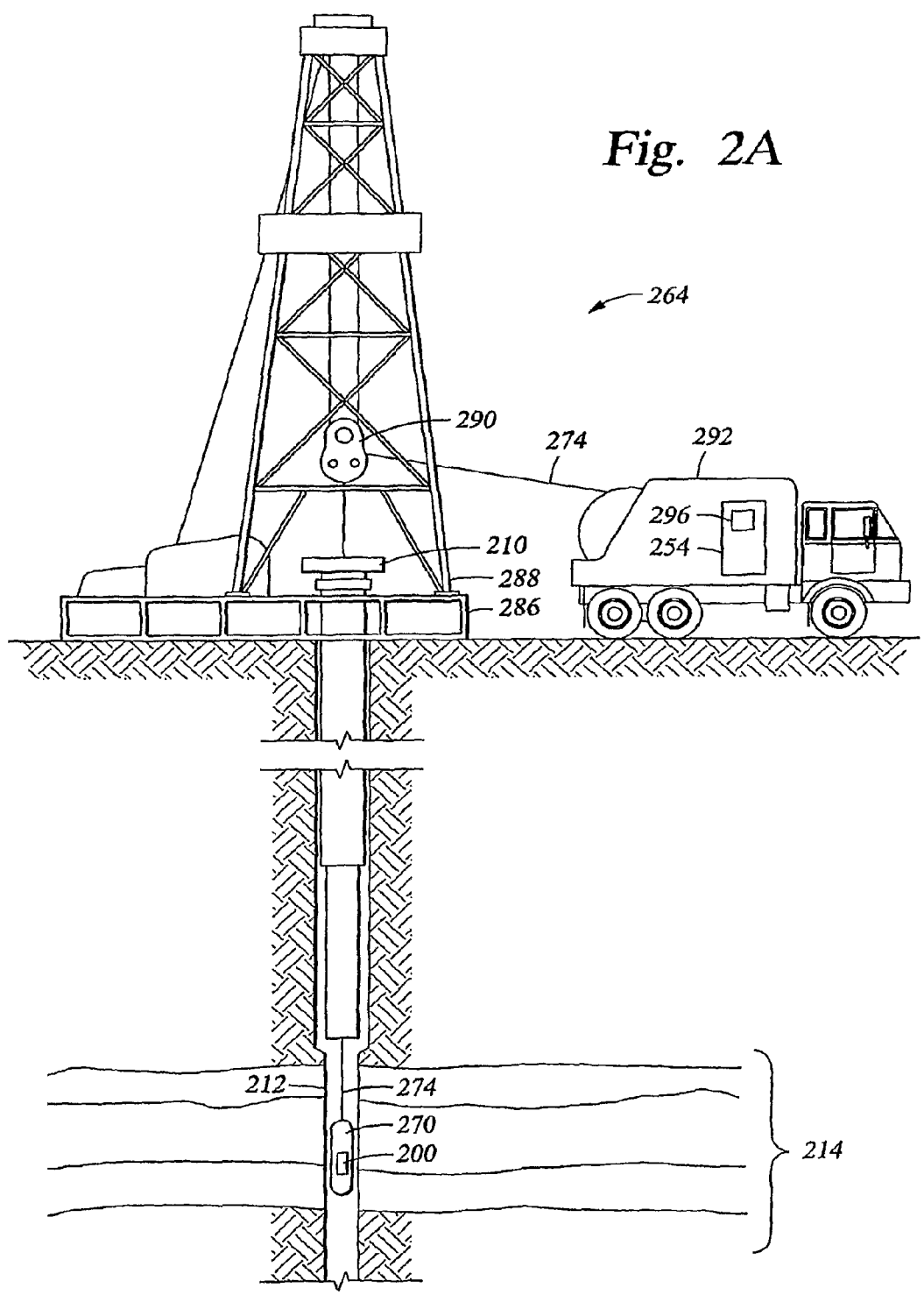
FIGS. 2A-2B illustrate apparatus and systems according to various embodiments of the invention.
Figure 2B:
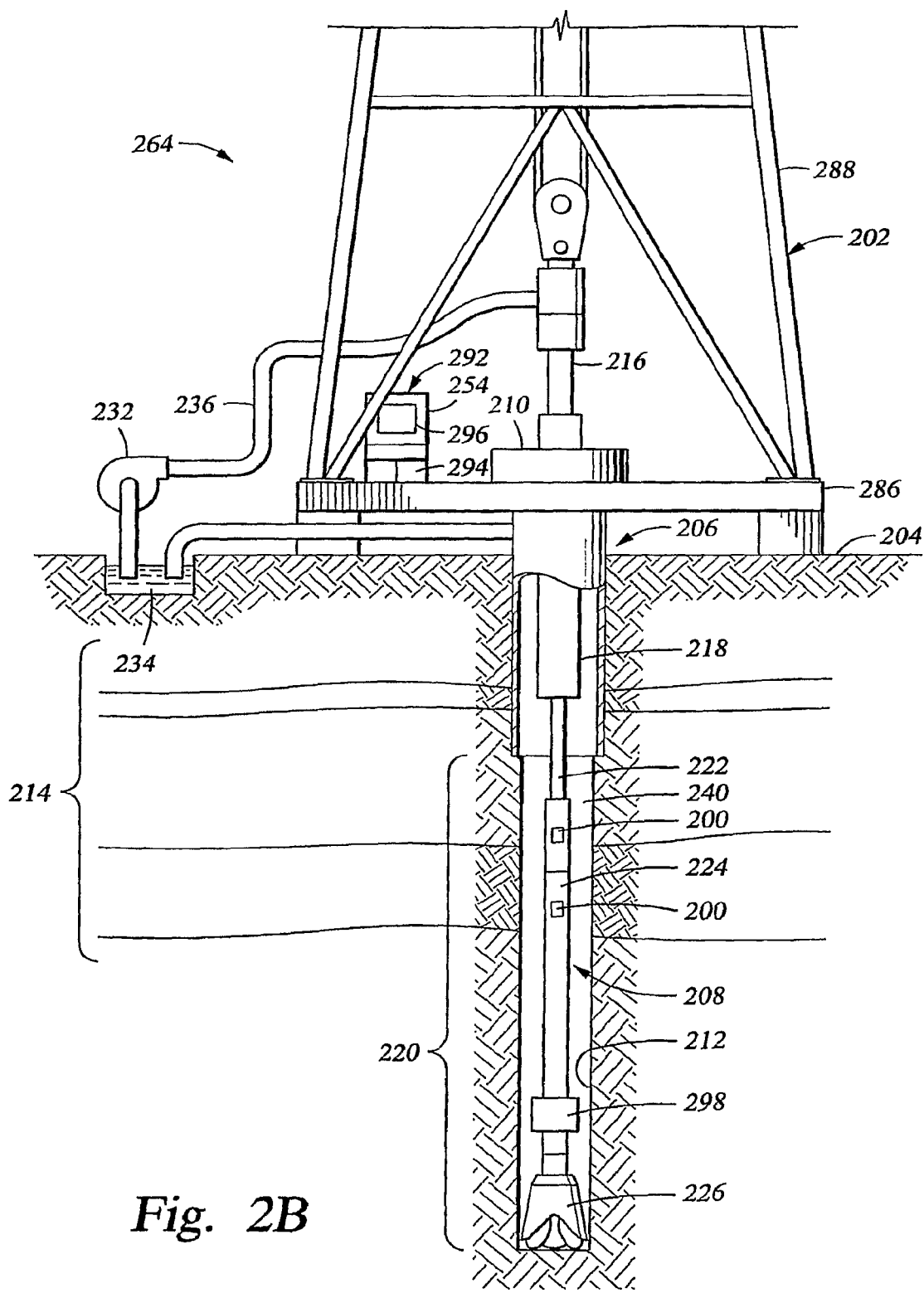

FIGS. 2A-2B illustrates apparatus 200 and systems 264 according to various embodiments of the invention. The apparatus 200, which may be similar to or identical to the apparatus 100 described above and shown in FIG. 1B, may comprise portions of a tool body 270 as part of a wireline logging operation, or of a downhole tool 224 (similar to or identical to the tool 86 of FIG. 1A) as part of a downhole drilling operation. A system may comprise more than one of the apparatus 200.

FIG. 2A shows a well during wireline logging operations. A drilling platform 286 may be equipped with a derrick 288 that supports a hoist 290. Oil and gas well drilling operations are commonly carried out using a string of drill pipes connected together so as to form a drilling string that is lowered through a rotary table 210 into a wellbore or borehole 212.

Here it is assumed that the drilling string has been temporarily removed from the borehole 212 to allow a tool body 270 (e.g., a wireline logging tool), such as a probe or sonde, to be lowered by wireline or logging cable 274 into the borehole 212. Typically, the tool body 270 is lowered to the bottom of the region of interest and subsequently pulled upward at a substantially constant speed. During the upward trip, instruments included in the tool body 270 (e.g., apparatus 200) may be used to perform measurements on the subsurface formations 214 adjacent the borehole 212 as they pass by, or as the tool body 270 remains stationary.

Measurement data (e.g., similar or identical to data 112 of FIG. 1B) may include standoff distance data that can be communicated to a logging facility 292 for storage, processing, and analysis. The logging facility 292 may be provided with electronic equipment for various types of signal processing. Similar log data may be gathered and analyzed during drilling operations (e.g., during logging while drilling (LWD) operations). For example, the tool body 270 in this case may house one or more apparatus 200, and the logging facility 292 may include one or more surface computers 254, similar to or identical to the computer 136 described above with respect to FIG. 1B.

Turning now to FIG. 2B, it can be seen how a system 264 may also form a portion of a drilling rig 202 located at a surface 204 of a well 206. The drilling rig 202 may provide support for a drill string 208. The drill string 208 may operate to penetrate a rotary table 210 for drilling a borehole 212 through subsurface formations 214. The drill string 208 may include a Kelly 216, drill pipe 218, and a bottomhole assembly 220, perhaps located at the lower portion of the drill pipe 218. The drill string 208 may include wired and unwired drill pipe, as well as wired and unwired coiled tubing, including segmented drilling pipe, casing, and coiled tubing.

The bottomhole assembly 220 may include drill collars 222, a downhole tool 224, and a drill bit 226. The drill bit 226 may operate to create a borehole 212 by penetrating the surface 204 and subsurface formations 214. The downhole tool 224 may comprise any of a number of different types of tools including measurement while drilling (MWD) tools, LWD tools, and others.

During drilling operations, the drill string 208 (perhaps including the Kelly 216, the drill pipe 218, and the bottomhole assembly 220) may be rotated by the rotary table 210. In addition to, or alternatively, the bottomhole assembly 220 may also be rotated by a top drive or a motor (e.g., a mud motor) that is located downhole. The drill collars 222 may be used to add weight to the drill bit 226. The drill collars 222 also may stiffen the bottomhole assembly 220 to allow the bottomhole assembly 220 to transfer the added weight to the drill bit 226, and in turn, assist the drill bit 226 in penetrating the surface 204 and subsurface formations 214.

During drilling operations, a mud pump 232 may pump drilling fluid (sometimes known by those of ordinary skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226.

Thus, referring now to FIGS. 1A-1B and 2A-2B, it may be seen that in some embodiments, the system 264 may include a drill collar 222, and/or a downhole tool 224, including a tool body 270 or a substantially permanently installed probe (in a downhole well), to which one or more apparatus 200 are attached. The downhole tool 224 may comprise an LWD tool or MWD tool. The tool body 270 may comprise a wireline logging tool, including a probe or sonde, for example, coupled to a cable 274, such as a wireline or logging cable. Thus, a wireline 274 or a drill string 208 may be mechanically coupled to the downhole tool 224.

In some embodiments then, a system 264, such as a caliper measurement system, may include a downhole tool 270 and acquisition logic 110 as described above and shown in FIG. 1B. The acquisition logic 110, as well as any other part of the apparatus 100, 200, including the processing logic 116, may be housed by the downhole tool 270.

In some embodiments, the system 264 may include a drill bit 226 mechanically coupled to a drill string 208 and the downhole tool 224. The drill string may include one or more of segmented drilling pipe, casing, and/or coiled tubing. The system 264 may further include a steering mechanism 298 to steer the drill bit 226 responsive to determined caliper measurements, adjusted neutron measurements, adjusted natural gamma radiation measurements, adjusted porosity measurements, or adjusted density measurements.

In some embodiments, the system 264 may include a receiver 294 to receive the determined caliper measurements, and a memory (not shown) to store the determined caliper measurements in a log (e.g., within the logging facility 292). The system 264 may also include one or more displays 296 to display visual representations of determined caliper measurements, ellipticity, adjusted neutron measurements, adjusted natural gamma radiation measurements, or adjusted density measurements. The display 296 may be included as part of a surface computer 254 used to receive data from the acquisition logic 110, if desired.

The acquisition apparatus 80; transducer or sensor 82; tool outer surface 84; tools 86, 224; azimuthal direction 88; centerline 90; boreholes 92, 212, propagation medium 94; standoff data 96; contour 98; measurement apparatus 100, 200; acquisition logic 110; data 112; processing logic 116; ellipticity alarm 120; telemetry transmitters 128; signals 130; displays 132, 296; computers 136, 254; drilling rig 202; surface 204; well 206; drill string 208; rotary table 210; formations 214; Kelly 216; drill pipe 218; bottomhole assembly 220; drill collars 222; drill bit 226; mud pump 232; mud pit 234; hose 236; annular area 240; systems 264; tool body or probe 270; cable 274; drilling platform 286; derrick 288; hoist 290; logging facility 292; receiver 294; steering mechanism 298; azimuthal bins A-H; average borehole diameter AD; correction factors CF1, CF2, CF3, CF4; major and minor elliptical axis lengths MA, MI; standoff distance SD; standard deviation ST; and tool radius TR may all be characterized as "modules" herein. Such modules may include hardware circuitry, and/or a processor and/or memory circuits, software program modules and objects, and/or firmware, and combinations thereof, as desired by the architect of the apparatus 80, 100, 200 and systems 264, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for borehole drilling and logging operations, and thus, various embodiments are not to be so limited. The illustrations of apparatus 80, 100, 200 and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as process measurement instruments, personal computers, workstations, medical devices, vehicles, among others. Some embodiments include a number of methods.

Figure 3:
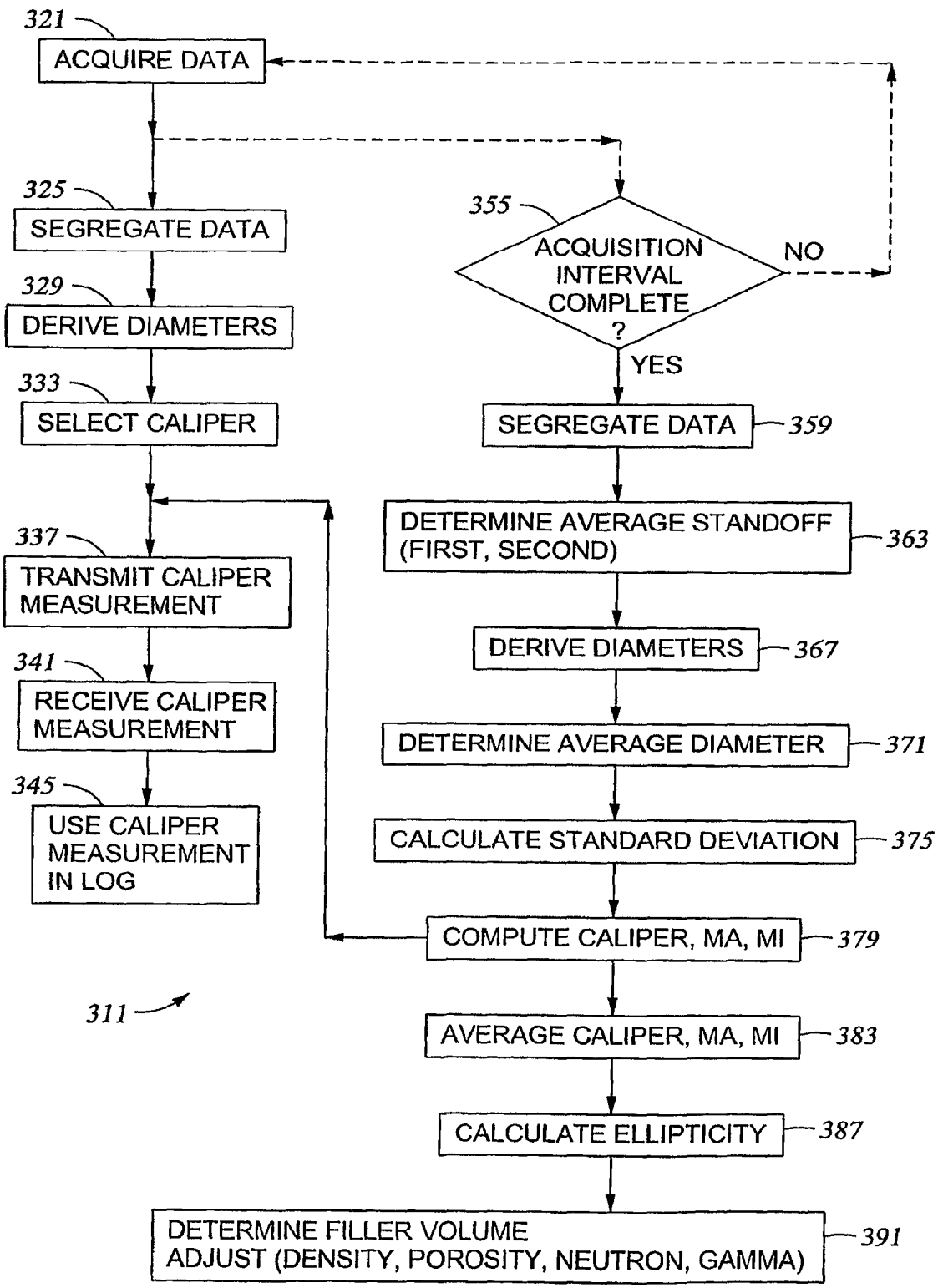
FIG. 3 illustrates a method flow diagram according to various embodiments of the invention.

For example, FIG. 3 illustrates a method flow diagram 311 according to various embodiments of the invention. In some embodiments of the invention, a method 311 may begin at block 321 with acquiring the borehole standoff data, perhaps using a single rotating transducer, or a gamma-gamma density tool. The transducer may comprise a pulse-echo ultrasonic transducer, or a receiving unit of a pitch-catch ultrasonic transducer pair.

The method 311 may then continue with segregating borehole standoff data into a plurality of azimuthal bins at block 325, and deriving a plurality of diameters from the borehole standoff data in the plurality of azimuthal bins at block 329. Segregating borehole standoff data at block 325 may include segregating borehole standoff data as a function of any one of magnetic azimuth, true azimuth, and magnetic toolface.

As noted above, the plurality of diameters may be derived using borehole standoff data in opposing ones of the plurality of azimuthal bins in some cases, and in others, borehole standoff data in other bins (e.g., using a first bin and another bin to one side or the other of the directly opposing bin) may be used. In some embodiments, the method 311 may continue with selecting one of the plurality of diameters, or a combination of diameters (e.g., a simple average of the diameters) as a caliper measurement at block 333. Selecting the caliper may also comprise selecting a mid value of the plurality of diameters as the caliper (e.g., if there are an odd number of calipers, selecting the caliper with the middle value, or if there are an even number, selecting one of the two caliper values closest to the middle value, or an average of the two caliper values closest to the middle value).

The method 311 may include, at block 337, transmitting the caliper measurement to the surface (e.g., above ground). The method 311 may also include receiving the caliper measurement as a received caliper measurement at block 341, and using the received caliper measurement in a log at block 345.

In some embodiments, a method 311 may continue to block 355 after acquiring the borehole standoff data at block 321. At block 355, if the data acquisition interval is determined to be incomplete, then the method 311 may go back to acquiring additional data at block 321. The acquisition interval may be selected for one revolution of the transducer or other sensor, or perhaps for more than a single revolution (e.g., 1.5 revolutions, as described above, or 2 revolutions, or any other number). Once the acquisition interval is completed, as determined at block 355, then the method 311 may include segregating the acquired borehole standoff data into a plurality of azimuthal bins at block 359. Segregating the borehole standoff data at block 359 may include segregating the borehole standoff data as a function of any one of magnetic azimuth, true azimuth, and magnetic toolface.

The method 311 may continue with determining a first average standoff value within each one of the plurality of azimuthal bins at block 363. If the data has been acquired over more than one rotation, then block 363 may include determining a second average standoff value within a subset of the plurality of azimuthal bins, and determining, within the subset of the plurality of azimuthal bins, a combined average value of the first average standoff value and the second average standoff value, as described above with respect to the example of a rotation interval of 540 degrees. A subset of bins covering more or less than 180 degrees may be used to determine the combined average, if desired.

The method 311 may continue at block 367 with deriving a plurality of diameters from the borehole standoff data in opposing ones of the plurality of azimuthal bins. As noted above, the plurality of diameters may also be derived by using borehole standoff data in other than opposing ones of the plurality of azimuthal bins (e.g., using a first bin and another bin to one side or the other of the directly opposing bin). Deriving the plurality of diameters may comprise adding the average standoff value from a first one of the plurality of azimuthal bins to the average standoff value from a second one of the plurality of azimuthal bins, and then adding this sum of averaged standoff values to the tool diameter.

The method 311 may continue at block 371 with determining an average borehole diameter from the plurality of diameters derived at block 367. The method 311 may include calculating a standard deviation from the average borehole diameter at block 375, and then computing, at block 379, a caliper measurement, a major elliptical axis length, and/or a minor elliptical axis length based on the average borehole diameter and the standard deviation. The method 311 may continue from block 379 to either one of blocks 337 or 383, or both.

Thus, in some embodiments, the method 311 may include averaging a plurality of calipers over an acquisition interval that includes more than one revolution of a single transducer to provide the caliper measurement at block 383. Similarly, the method 311 may include averaging a plurality of major axis lengths over an acquisition interval that includes more than one revolution of a single transducer to provide the major elliptical axis. The method 311 may also include averaging a plurality of minor axis lengths over an acquisition interval including more than one revolution of a single transducer to provide the minor elliptical axis.

At block 387, the method 311 may include calculating ellipticity from the major elliptical axis length and the minor elliptical axis length, perhaps to be used as a direct indication of borehole stress. At block 391, the caliper measurement can be used to determine or adjust various quantities. For example, given the casing outer diameter, the borehole wall inner diameter, and the length of the borehole, the method 311 may including determining a volume of filler material (e.g., cement that goes between the casing and the borehole wall) from the caliper measurement. The method 311 may also include adjusting formation porosity estimates, density measurements, neutron measurements, and natural gamma ray measurements based on the caliper measurement.

It should be noted that the methods described herein do not have to be executed in the order described. Moreover, various activities described with respect to the methods identified herein can be executed in iterative, serial, or parallel fashion. Information, including parameters, commands, operands, and other data, can be sent and received, and perhaps stored using a variety of media, tangible and intangible, including one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand that various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 4:
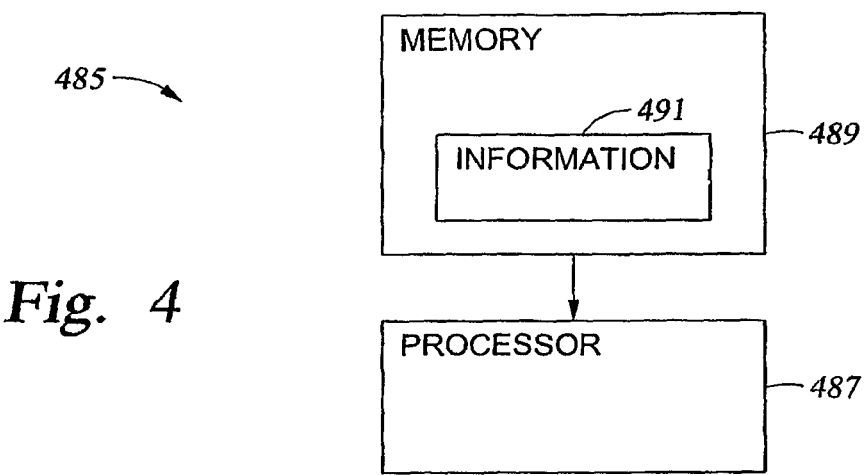
FIG. 4 is a block diagram of an article according to various embodiments of the invention.

FIG. 4 is a block diagram of an article of manufacture, or article 485 according to various embodiments, such as a computer, a memory system, a magnetic or optical disk, some other storage device, and/or any type of electronic device or system. The article 485 may include a processor 487 coupled to a computer-readable medium such as a memory 489 (e.g., fixed and removable storage media, including tangible memory having electrical, optical, or electromagnetic conductors; or even intangible memory, such as a carrier wave) having associated information 491 (e.g., computer program instructions and/or data), which when executed by a computer, causes the computer (e.g., the processor 487) to perform a method including such actions as segregating borehole standoff data into a plurality of azimuthal bins, deriving a plurality of diameters from the borehole standoff data in opposing ones of the plurality of azimuthal bins, and selecting one of the plurality of diameters or a combination of diameters as a caliper measurement. In fact, any of the activities described with respect to the various methods above may be implemented in this manner.

Figure 5:
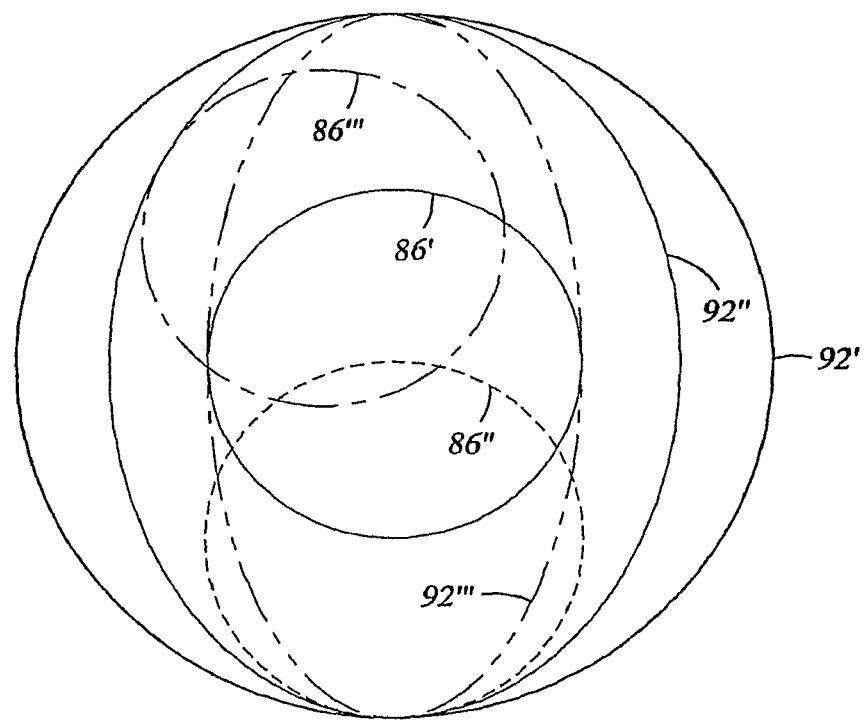
FIG. 5 is a top view, conceptual diagram of a downhole tool positioned in a borehole, according to various embodiments of the invention.

To further demonstrate benefits of the disclosed apparatus, systems, and methods, an example implementation will now be discussed. FIG. 5 is atop view, conceptual diagram of a downhole tool 86", 86', 86''' positioned in a borehole 92', 92",

92''', according to various embodiments of the invention, Given the conceptual realization of FIG. 5, a wide range of conditions in circular and elliptical boreholes can be considered. The borehole shapes considered were a 10 cm (4 in.) diameter circle, represented by borehole 92', an ellipse with a major axis length of 10 cm (4 in.) and a minor axis length of 7.5 cm (3 in.), represented by borehole 92", and an ellipse with a major axis length of 10 cm (4 in.) and a minor axis length of 5 cm (2 in.), represented by borehole 92''', The tool diameter was taken as 2.5 cm (1 in.). Those of ordinary skill in the art will realize that the results obtained can be scaled to other geometries. It should be noted that these are extreme examples, since the circular-borehole diameter is four times as big as the tool diameter, and the major axis of one ellipse has twice the length of its minor axis. For simplicity, the value of each azimuthal bin was taken as the standoff at the center of the bin rather than an average over all azimuths in the bin.

Seven different cases were studied: three with circular boreholes and four with elliptical boreholes. The circular boreholes used circle 92' as the borehole and considered the tool in locations 86' (Circular Case 2), 86" (Circular Case 1), and 86''' (Circular Case 3). The elliptical boreholes used ellipse 92" with tool positions 86' (Elliptical Case 2), 86" (Elliptical Case 1), and 86''' (Elliptical Case 3), as well as ellipse 92''' with tool position 86' (Elliptical Case 4). The radii and apparent diameters measured at different angles were arithmetically determined for each case. The average and standard deviation of the apparent diameters were then determined for each case. The difference between the major axis and the average of apparent diameters represents the major-axis correction, and the difference between the minor axis and the average of apparent diameters represents the minor-axis correction.

Figure 6A:
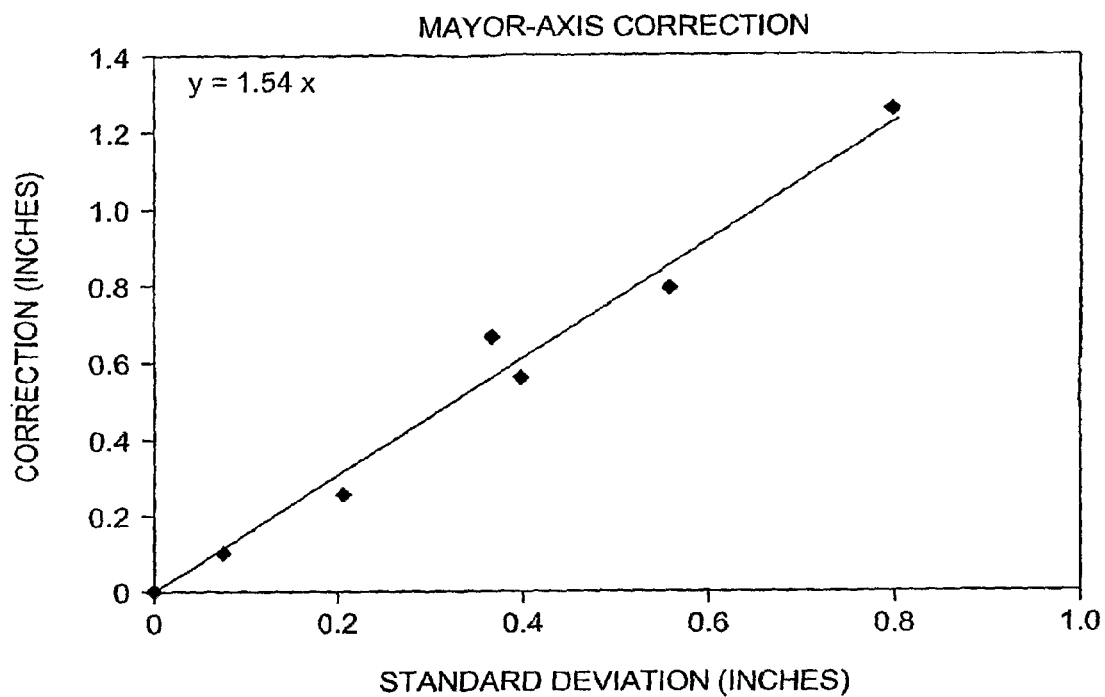
FIGS. 6A-6B illustrate graphs of corrections versus standard deviation for the major and minor axis, according to various embodiments of the invention.
Figure 6B:
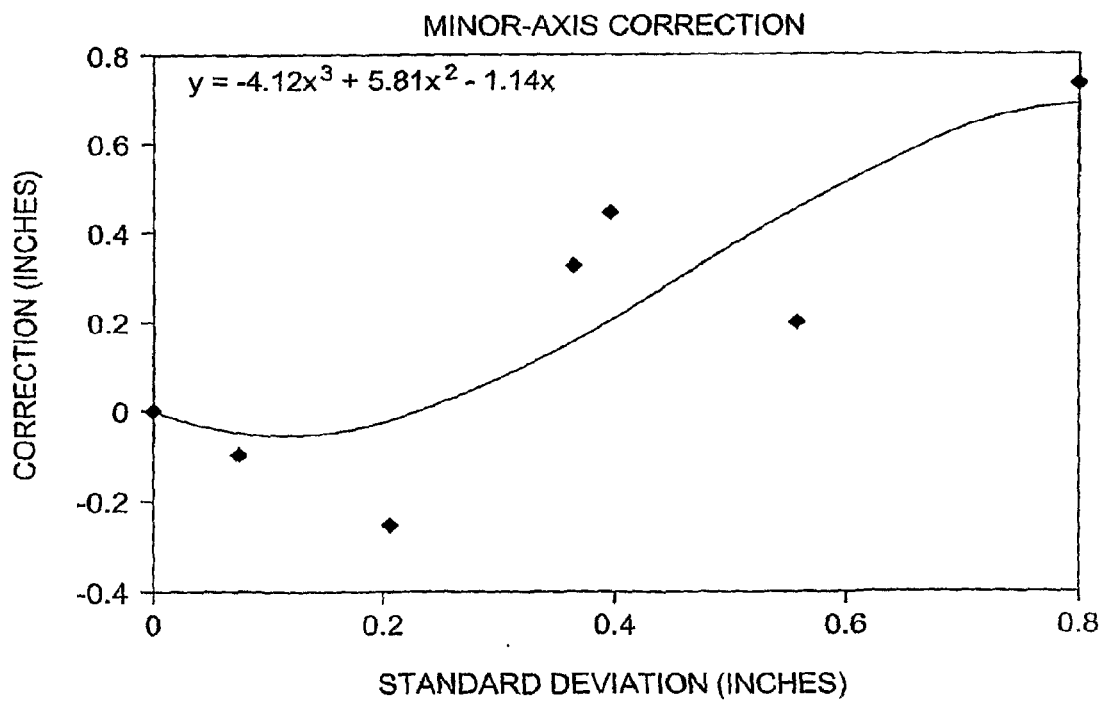

FIGS. 6A-6B illustrate graphs of corrections versus standard deviation for the major and minor axis, according to various embodiments of the invention. The seven points represent the seven different cases (three circular and four elliptical). There is clearly a correlation between the required correction and the standard deviation. The graphs and equations illustrate correction as a function of the standard deviation with a solid line.

Since the correction in each case is defined as the difference between the true axis length and the average diameter, the axis lengths are obtained by adding the corrections to the average diameter. This leads to the following equations.

$$\text{Major Axis Length }(MA) = \text{Average Diameter }(AD) + 1.54 * \text{StdDev }(STD)$$

$$\text{Minor Axis Length }(MI) = \text{Average Diameter }(AD) + 1.14 * \text{StdDev }(STD) - 5.81 * \text{StdDev}^2\,(STD^2) + 4.12 * \text{StdDev}^3\,(STD^3)$$

Thus, the values 1.54, 1.14, −5.81, and 4.12 correspond to the correction factors CF1, CF2, CF3, and CF4 described previously. In practice, the specific numeric values for correction factors in the above equations will be slightly different due to the averaging over each azimuthal bin and averaging effects characteristic of the tool. Applying these equations to the cases described above led to the results listed in the tables I and II below. For simplicity, all dimensions in the tables and figures are shown in inches.

TABLE I

| | Circular Borehole | | | | | | | |
|---|---|---|---|---|---|---|---|---|
| Case | Actual Dimension | | Computed Dimension | | | | Computation Error | |
| No. | Major Axis | Minor Axis | Major Axis | Minor Axis | Caliper | Ellipticity | Caliper | Ellipticity |
| 1 | 4 | 4 | 4.06 | 3.76 | 3.91 | 1.08 | −2% | 8% |
| 2 | 4 | 4 | 4.00 | 4.00 | 4.00 | 1.00 | 0% | 0% |
| 3 | 4 | 4 | 4.01 | 3.95 | 3.98 | 1.02 | 0% | 2% |

TABLE II

| | Elliptical Borehole | | | | | | | |
|---|---|---|---|---|---|---|---|---|
| Case | Actual Dimension | | Computed Dimension | | | | Computation Error | |
| No. | Major Axis | Minor Axis | Major Axis | Minor Axis | Caliper | Ellipticity | Caliper | Ellipticity |
| 1 | 4 | 3 | 4.07 | 2.75 | 3.41 | 1.48 | −3% | 11% |
| 2 | 4 | 3 | 4.05 | 3.23 | 3.64 | 1.25 | 4% | −6% |
| 3 | 4 | 3 | 3.89 | 3.17 | 3.53 | 1.23 | 1% | −8% |
| 4 | 4 | 2 | 3.97 | 2.04 | 3.01 | 1.94 | 0% | −3% |

The worst result for the circular borehole is with the tool positioned one tool radius off center (Case No. 1), which is very extreme. More typically, the borehole diameter would be less than 1.25 times the tool diameter, so the offset would not be less than one fourth of the tool radius. Thus, in circular boreholes the caliper error should generally be 0.5% or less and the ellipticity error less than 2%. Using a 15 cm (6-in.) diameter tool in a 19 cm (7.5-in.) diameter hole, for example, this translates to a maximum caliper error of about 0.1 cm (0.038 in.) and a maximum ellipticity error of about 2% —more than adequate precision in most situations.

The worst caliper error for elliptical boreholes occurs for case 2. Thus, the average caliper measurement in an elliptical borehole with a minor axis length of 15 cm (6 in.) and a major axis length of 20 cm (8 in.) will have an error of about 0.7 cm (0.27 in.), which is still quite useful for correcting nuclear measurements.

Thus, it should be noted that various embodiments of the invention described herein each provide a useful, concrete, and tangible result. The embodiments disclosed are useful because, for example, caliper measurements may provide a direct indication of the state of formation stress in a borehole, or the outcome of a particular drilling technique. This indication is specific, substantial, and credible. Caliper measurements are tangible, because they convey the real-world, as opposed to abstract, contour of the borehole at the point where standoff distance measurements are made. Caliper measurements are also concrete, since the measurements are substantially repeatable.

Implementing the apparatus, systems, and methods of various embodiments may provide the ability to determine borehole caliper measurements at reduced cost, since only a single transducer is needed. Measurement accuracy may also improve, even over a conventional two-transducer system, when used in elliptical boreholes. Accurate measurements can also be obtained more rapidly, since less data processing is required than in some other systems known to those of ordinary skill in the art, especially when tool motion in the borehole occurs. Thus, indications of formation stress and compaction, as well as adjustments to various measurements, may be arrived at with greater confidence in a variety of situations.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
launching a signal into a borehole and acquiring a signal returned from the launching using one or more measurement tools disposed in the borehole;
acquiring borehole standoff data using acquisition logic circuitry to transform the acquired signals into the borehole standoff data;
segregating the borehole standoff data into a plurality of azimuthal bins;
deriving a plurality of diameters from the borehole standoff data in the plurality of azimuthal bins; and
determining a caliper measurement as a combination of an average of the plurality of diameters and a standard deviation of the plurality of diameters, the standard deviation generated with respect to a population comprising the plurality of diameters.

2. The method of claim 1, comprising:
acquiring the borehole standoff data using a single rotating transducer.

3. The method of claim 1, comprising:
acquiring the borehole standoff data using a gamma-gamma density tool.

4. The method of claim 1, wherein the determining comprises:
selecting a mid value of the plurality of diameters as the average.

5. The method of claim 1, wherein the plurality of diameters are derived from the borehole standoff data in opposing ones of the plurality of azimuthal bins, the plurality of azimuthal bins being an even number of azimuthal bins greater than four and arranged based on direction.

6. The method of claim 1, wherein segregating borehole standoff data into a plurality of azimuthal bins comprises:
segregating borehole standoff data as a function of any one of magnetic azimuth, true azimuth, and magnetic toolface.

7. The method of claim 1, comprising:
transmitting the caliper measurement above ground.

8. The method of claim 7, comprising:
receiving the caliper measurement as a received caliper measurement; and
using the received caliper measurement in a log.

9. A method, comprising:
launching signals into a borehole and acquiring signals returned from the launching using one or more measurement tools disposed in the borehole;
acquiring borehole standoff data using acquisition logic circuitry to transform the acquired signals into the borehole standoff data;
segregating the borehole standoff data into a plurality of azimuthal bins;
deriving a plurality of diameters from the borehole standoff data in the plurality of azimuthal bins;
determining an average borehole diameter from the plurality of diameters;
calculating a standard deviation of the plurality of diameters from the average borehole diameter, the standard deviation generated with respect to a population comprising the plurality of diameters; and
computing a major elliptical axis length and a minor elliptical axis length of an ellipse based on the average borehole diameter and the standard deviation, the ellipse approximating a contour of a borehole wall correlated to the borehole standoff data.

10. The method of claim 9, comprising:
acquiring the borehole standoff data during at least one revolution of a single rotating transducer.

11. The method of claim 9, wherein deriving the plurality of diameters comprises:

deriving the plurality of diameters from the borehole standoff data in opposing ones of the plurality of azimuthal bins.

12. The method of claim 9, comprising:
determining a first average standoff value within each one of the plurality of azimuthal bins.

13. The method of claim 9, wherein deriving the plurality of diameters comprises:
adding a first average standoff value from a first one of the plurality of azimuthal bins to a first average standoff value from a second one of the plurality of azimuthal bins, and a tool diameter.

14. The method of claim 12, comprising:
determining a second average standoff value within a subset of the plurality of azimuthal bins; and
determining, within the subset of the plurality of azimuthal bins, a combined average value of the first average standoff value and the second average standoff value.

15. The method of claim 9, comprising:
averaging a plurality of calipers over an acquisition interval including more than one revolution of a single transducer to provide a caliper measurement.

16. The method of claim 9, comprising:
averaging a plurality of major axis lengths over an acquisition interval including more than one revolution of a single transducer to provide the major elliptical axis length.

17. The method of claim 9, comprising:
averaging a plurality of minor axis lengths over an acquisition interval including more than one revolution of a single transducer to provide the minor elliptical axis length.

18. The method of claim 9, comprising:
calculating ellipticity from the major elliptical axis length and the minor elliptical axis length as an indication of borehole stress.

19. The method of claim 9, comprising:
determining a caliper using the major elliptical axis length and the minor elliptical axis length; and
determining a filler material volume from the caliper.

20. The method of claim 9, comprising:
determining a caliper using the major elliptical axis length and the minor elliptical axis length; and
adjusting a formation porosity estimate based on the caliper.

21. The method of claim 9, comprising:
determining a caliper using the major elliptical axis length and the minor elliptical axis length; and
adjusting a density measurement based on the caliper.

22. The method of claim 9, comprising:
determining a caliper using the major elliptical axis length and the minor elliptical axis length; and
adjusting a natural gamma ray measurement based on the caliper.

23. The method of claim 9, wherein segregating borehole standoff data into a plurality of azimuthal bins comprises:
segregating borehole standoff data as a function of any one of magnetic azimuth, true azimuth, and magnetic toolface.

24. The method of claim 9, comprising:
determining a caliper using the major elliptical axis length and the minor elliptical axis length; and
transmitting the caliper above ground.

25. The method of claim 9, comprising:
determining a caliper using the major elliptical axis length and the minor elliptical axis length; and
receiving the caliper as a received caliper measurement; and
using the received caliper measurement in a log.

26. An apparatus, comprising:
one or more measurement tools to launch signals into a borehole and to acquire signals returned from the launching;
acquisition logic circuitry to acquire borehole standoff data from transformation of the acquired signals; and
processing logic circuitry to segregate the borehole standoff data into a plurality of azimuthal bins, derive a plurality of diameters from the borehole standoff data in the plurality of azimuthal bins, determine an average borehole diameter from the plurality of diameters, calculate a standard deviation from the plurality of diameters, and compute at least one of a caliper measurement, a major elliptical axis length, or a minor elliptical axis length based on the average borehole diameter and the standard deviation, the standard deviation generated with respect to a population comprising the plurality of diameters.

27. The apparatus of claim 26, comprising:
an ellipticity alarm to indicate out-of-range ellipticity based on the major elliptical axis length and the minor elliptical axis length.

28. The apparatus of claim 26, wherein the processing logic circuitry is to adjust a neutron measurement based on the caliper measurement.

29. The apparatus of claim 26, wherein the processing logic circuitry is to adjust a density measurement based on the caliper measurement.

30. The apparatus of claim 26, wherein the processing logic circuitry is to adjust a natural gamma ray measurement based on the caliper measurement.

31. The apparatus of claim 26, comprising:
a rotating transducer to couple to the acquisition logic circuitry and to provide the borehole standoff data.

32. The apparatus of claim 26, comprising:
a gamma-gamma density tool to couple to the acquisition logic circuitry and to provide the borehole standoff data.

33. The apparatus of claim 26, comprising:
a display to display the caliper measurement.

34. The apparatus of claim 26, wherein the processing logic circuitry is to derive the plurality of diameters from the borehole standoff data in opposing ones of the plurality of azimuthal bins.

35. The apparatus of claim 26, wherein the processing logic circuitry is to segregate the borehole standoff data into a plurality of azimuthal bins as a function of any one of magnetic azimuth, true azimuth, and magnetic toolface.

36. The apparatus of claim 26, comprising:
a transmitter to transmit the at least one of the caliper measurement, the major elliptical axis length, or the minor elliptical axis length above ground.

37. A system, comprising:
a downhole tool;
one or more measurement tools to launch signals into a borehole and to acquire signals returned from the launching;
acquisition logic circuitry included in the downhole tool to acquire borehole standoff data from transformation of the acquired signals; and
processing logic circuitry to segregate the borehole standoff data into a plurality of azimuthal bins, derive a plurality of diameters from the borehole standoff data in the plurality of azimuthal bins, determine an average borehole diameter from the plurality of diameters, calculate a standard deviation of the plurality of diameters from the average borehole diameter, and compute at least one of a caliper measurement, a major elliptical axis length, or a minor elliptical axis length based on the average borehole diameter and the standard deviation, the standard deviation generated with respect to a population comprising the plurality of diameters.

38. The system of claim 37, wherein the processing logic is included in the downhole tool.

39. The system of claim 37, comprising:
a drill bit mechanically coupled to a drill string and the downhole tool; and
a steering mechanism to steer the drill bit within a formation responsive to the caliper measurement.

40. The system of claim 37, wherein the drill string includes at least one of segmented drilling pipe and coiled tubing.

41. The system of claim 37, comprising:
a receiver to receive the caliper measurement; and
a memory to store the caliper measurement in a log.

42. A non-transitory computer-readable medium having instructions stored thereon which, when executed by a processor of a system, cause the system to perform a method comprising:
launching a signal into a borehole and acquiring a signal returned from the launching using one or more measurement tools disposed in the borehole;
acquiring borehole standoff data using acquisition logic circuitry to transform the acquired signals into the borehole standoff data;
segregating the borehole standoff data into a plurality of azimuthal bins;
deriving a plurality of diameters from the borehole standoff data in the plurality of azimuthal bins; and
determining a caliper measurement as a combination of an average of the plurality of diameters and a standard deviation of the plurality of diameters, the standard deviation generated with respect to a population comprising the plurality of diameters.

* * * * *